June 4, 1935.  J. W. HALE  2,003,857
CENTRIFUGALLY CONTROLLED VALVE
Original Filed Aug. 7, 1933
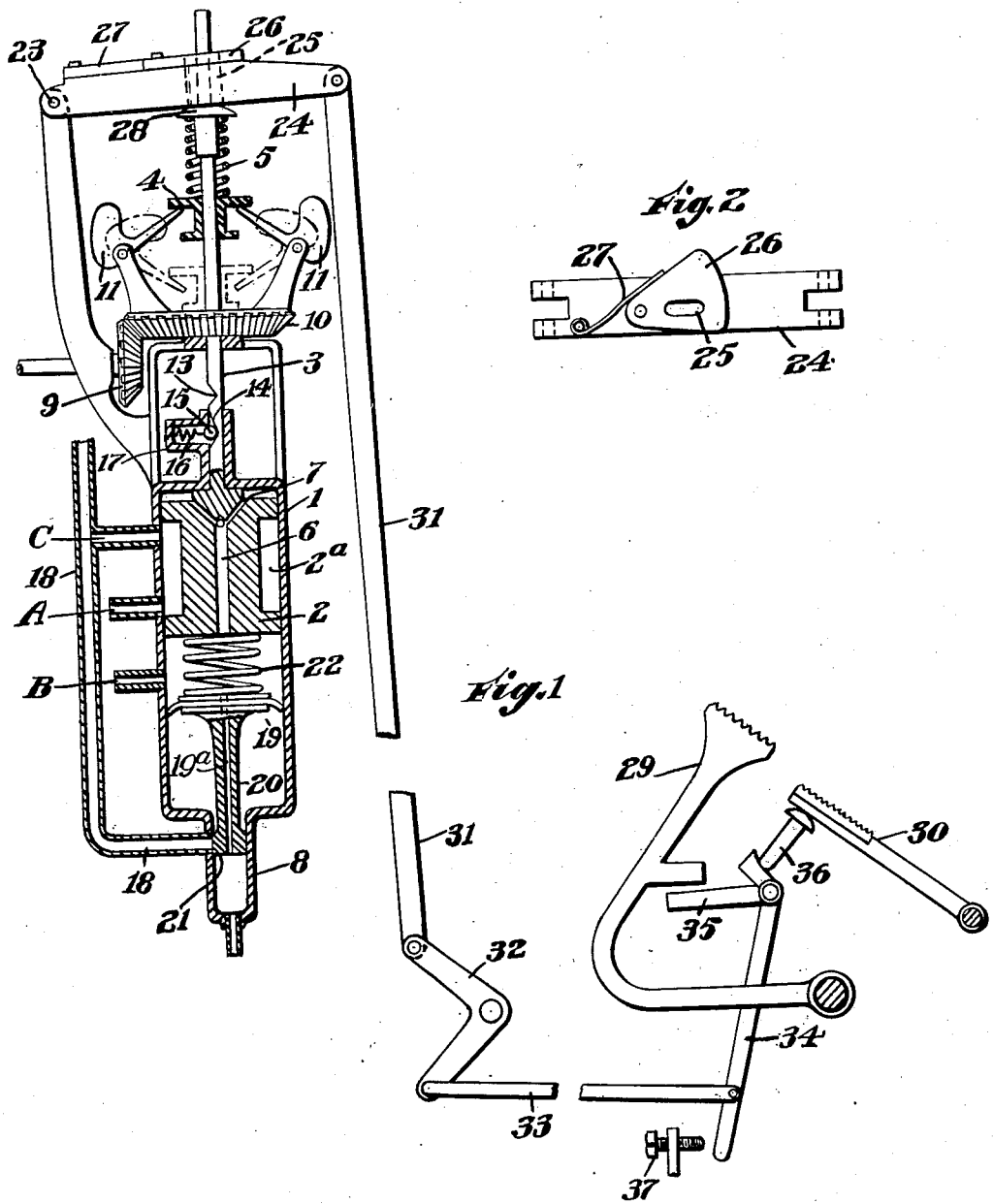
Inventor
Jesse W. Hale
By Attorney Patented June 4, 1935

2,003,857

UNITED STATES PATENT OFFICE 2,003,857

CENTRIFUGALLY CONTROLLED VALVE

Jesse W. Hale, Newton Center, Mass.

Original application August 7, 1933, Serial No. 683,918. Divided and this application December 9, 1933, Serial No. 701,720

8 Claims. (Cl. 137—140)

This invention relates to a centrifugally controlled valve adapted to control pressure flow utilized to produce desired gear positioning in a change speed device of the type shown in my pending application, Serial No. 683,918, now Patent No. 1,980,798, of which this is a divisional application.

With most change speed devices, it is desired to provide control producing desired gear ratios automatically adjusted to the ability of the engine to handle the load and yet to have this control subjected to the operator's dominance.

One of the difficulties encountered with such controls is that of preventing re-shifting when a shift permits the same or greater speed to be produced by reduced engine speed.

I utilize a control to prevent too sudden response to acceleration and by utilizing part of the fluid under pressure, I am able to lessen the influence of the control over the governor to permit a lesser engine speed to maintain the high speed gear ratio.

I further contemplate using means to prevent my valve from becoming improperly positioned for I provide detents retarding valve movement until a positive movement is ensured and ensuring its movement far enough to produce the desired flow of fluid to affect a change of speed.

In the drawing I have shown an embodiment of my invention adapted primarily for use with an automobile though its other uses are obvious. Throughout the drawing and specification, like reference numerals are employed to designate corresponding parts and in the drawing:

Fig. 1 is a view partly in cross section of my centrifugally controlled valve and the dominant operator controls, and Fig. 2 is a face view of a lock to prevent movement.

In a casing 1, I mount a spool piston 2 on a rod 3 which carries a collar 4 depressed by a spring 5.

The spool piston 2 is formed with an annular recess 2a and a central bore 6 having radial vents 7 to allow escape of leakage through relief 8.

Fluid under pressure is admitted through the inlet pipe A. When the piston is in its lowest position, the outlet pipe B is connected with the inlet A by the annular recess 2a. As is shown in my pending application, Serial No. 683,918, the resultant flow of fluid adjusts the change speed device to neutral position and in that application means are shown to prevent the gears from adjusting to low speed position. A lock 26 is also provided to prevent upward movement of the rod 3.

From any suitable source of power, a gear 9 in mesh with the gear 10 is rotated. Pivotally mounted on the gear 10 are the weighted arms 11 which are swung outwardly as the gears 9 and 10 rotate more rapidly and as the arms 11 fly outwardly the contacts 12 lift the collar 4 on the rod 3 against the pressure of the spring 5.

On the rod 3, I form notches 13 and 14 adapted to receive the member 15 under the tension of the spring 16 in the casing 17. These notches tend to retard the movement of the shaft and as the notches are formed with a common apex and positioned in relation to the position of the piston 2 to affect low and high speed, the rod will snap upwardly or downwardly ensuring operative positioning of the piston 2. When the piston 2 has moved upward so that the outlet B is connected to relief 8, the notch 13 receives the member 15. In this position my change speed device as shown in my pending application, Serial No. 683,918, is adjusted to low speed gear ratios as the inlet A is connected to neither outlets B or C in this position.

With increase in engine speed the piston 2 is carried upwardly and the notch 14 on the rod 3 receives the member 15. In this position, the inlet A and the outlet C are connected by the annular recess 2a. This flow may be utilized to produce a high speed gear ratio such as direct drive.

As one of the obstacles to be overcome has been the tendency to shift back, I provide a branch fluid line 18 from the outlet C. This enters the casing 1 in the zone of relief 8.

Within the casing 1 in this zone is a piston 19 having its piston rod 20 formed as at 21 to seal the pipe 18. The piston 19 carries a spring 22 adapted to bear against the spool piston 2. The piston 19 and the piston rod 20 are provided with a central bore 19a permitting drainage to relief.

When the piston 2 is in its highest position, fluid under pressure will pass through the pipe 18 and carry the piston 19 upwardly so that it will be in the position shown in Fig. 1. In that position, it will offset the pressure of the spring 5 permitting a slower engine speed to maintain the piston 2 in position.

Anchored as at 23 is a lever 24 formed to receive the rod 3 through the aperture 25 unless the aperture 25 is closed by the lock 26. The lock 26 and a control to hold the change speed device in neutral may be made to act together if it is desired to warm the motor or repair it. Normally, however, the lock 26 is kept in operative position by the spring 27.

The lever 24 is adapted to bear against the washer 28 on the spring 5 to increase spring tension against the collar 4 to retard governor action and increase acceleration or deceleration.

The lever 24 is influenced by action of the brake 29 and the accelerator 30 through the pull rod 31, the pivoted elbow member 32, the rod 33, and the lever 34. The lever 34 includes an arm 35 to be contacted by the brake 29 and an arm 36 to be contacted by the accelerator 30. A stop 37 prevents excessive reverse movement of the levers against the brake 29 and accelerator 30. Through this system of control, resistance will be increased to the upward motion of the rod 3 for both braking and acceleration purposes possible through the difference in leverage afforded by the arms 35 and 36 on the lever 34.

With my invention, a simple and positive centrifugally controlled valve is provided adapted to permit a desired flow of fluid under pressure.

What I therefore claim and desire to secure by Letters Patent is:

1. A valve comprising a casing having top and relief apertures, a fluid inlet and fluid outlets above and below said inlet, a piston in said casing having an annular recess adapted to connect said inlet with one of said outlets, a rod carrying said piston, a collar on said rod, a compressible member influencing said collar and rod, means responsive to engine speed to carry said rod upwardly against said compressible member, a detent to prevent premature movement of said rod, and means in connection with one of said outlets to counteract the pressure of said compressible member.

2. A valve comprising a casing having top and relief apertures, a fluid inlet and fluid outlets above and below said inlet, a piston in said casing having an annular recess adapted to connect said inlet with one of said outlets, a rod carrying said piston, a collar on said rod, a compressible member influencing said collar and rod, means responsive to engine speed to carry said rod upwardly against said compressible member, a detent to prevent premature movement of said rod, means in connection with one of said outlets to counteract the pressure of said compressible member, and means adapted to be actuated by a brake and accelerator control to increase the resistance of said compressible member to upward movement of said rod.

3. A valve comprising a casing having top and relief apertures, a fluid inlet and fluid outlets above and below said inlet, a piston in said casing having an annular recess adapted to connect said inlet with one of said outlets, a rod carrying said piston, a collar on said rod, a compressible member influencing said collar and rod, means responsive to engine speed to carry said rod upwardly against said compressible member, means adapted to be actuated by a brake and accelerator control adapted to increase the resistance of said compressible member to upward movement of said rod, an inverted compensating piston below said first named piston, one of said outlets having a branch line to admit fluid under pressure to said compensating piston, a piston rod having branch line closing members on the end thereof, a resilient member carried by said second named piston whereby when said outlet and said inlet are connected, said inverted piston will be raised to counteract the pressure of said compressible member.

4. A valve comprising a casing having top and relief apertures, a fluid inlet and fluid outlets above and below said inlet, a piston in said casing having an annular recess adapted to connect said inlet with one of said outlets, a rod carrying said piston, a collar on said rod, a compressible member influencing said collar and rod, means responsive to engine speed to carry said rod upwardly against said compressible member, means in connection with one of said outlets to counteract the pressure of said compressible member, means adapted to be actuated by a brake and accelerator control to increase the resistance of said compressible member to upward movement of said rod, and a lock to prevent upward movement of said rod regardless of engine speed.

5. A valve comprising a casing, a fluid inlet and fluid outlets above and below said inlet, a drainage relief port in said casing, a piston in said casing adapted to connect said inlet with one of said outlets, a governor in control of said piston, a compressible member adapted to depress said governor, detents to prevent premature movement of said piston, means in connection with one of said outlets to counteract the pressure of said compressible member, and said piston and said means having apertures adapted to permit fluid above said piston and between said piston and said means to escape through said drainage port.

6. A valve comprising a casing, a fluid inlet and fluid outlets above and below said inlet, a piston in said casing adapted to connect said inlet with one of said outlets, a governor in control of said piston, a compressible member adapted to depress said governor, detents to prevent premature movement of said piston, means in connection with one of said outlets to counteract the pressure of said compressible member, and means adapted to be influenced by brake and accelerator controls whereby the resistance against upward movement of said piston is increased.

7. A valve comprising a casing, a fluid inlet and fluid outlets above and below said inlet, a piston in said casing adapted to connect said inlet with one of said outlets, a governor in control of said piston, a compressible member adapted to depress said governor, detents to prevent premature movement of said piston, means in connection with one of said outlets to counteract the pressure of said compressible member, and means in control of said compressible member adapted to be depressed by brake and accelerator controls whereby the resistance against upward movement of said piston is increased.

8. A valve comprising a casing, a fluid inlet and fluid outlets above and below said inlet, a piston in said casing adapted to connect said inlet with one of said outlets, means responsive to engine speed in control of said piston, a member adapted to depress said means, detents to prevent premature movement of said piston, means in connection with one of said outlets to counteract the pressure of said compressible member, and a lock to prevent upward movement of said rod regardless of engine speed.

JESSE W. HALE.